(12) United States Patent
Krell

(10) Patent No.: US 9,296,071 B2
(45) Date of Patent: Mar. 29, 2016

(54) STAND FOR A MACHINE

(71) Applicant: MS Spaichingen GmbH, Spaichingen (DE)

(72) Inventor: Volker Krell, Neuhausen ob Eck (DE)

(73) Assignee: MS SPAICHINGEN GMBH (DE)

(*) Notice: Subject to any disclaimer, the term of this patent is extended or adjusted under 35 U.S.C. 154(b) by 0 days.

(21) Appl. No.: 14/613,660

(22) Filed: Feb. 4, 2015

(65) Prior Publication Data
US 2015/0224605 A1    Aug. 13, 2015

(30) Foreign Application Priority Data
Feb. 10, 2014  (DE) .................... 10 2014 101 627

(51) Int. Cl.
| B23K 1/06 | (2006.01) |
|---|---|
| B23K 37/02 | (2006.01) |
| B23K 20/10 | (2006.01) |
| B23Q 11/00 | (2006.01) |
| B29C 65/08 | (2006.01) |
| B29C 65/00 | (2006.01) |

(52) U.S. Cl.
CPC .............. B23K 37/0211 (2013.01); B23K 20/10 (2013.01); B23K 37/0247 (2013.01); B23Q 11/0014 (2013.01); B29C 65/08 (2013.01); B29C 66/0062 (2013.01); B29C 66/816 (2013.01); B29C 66/8242 (2013.01); B29C 66/8322 (2013.01); B29C 66/9241 (2013.01); B29C 66/92211 (2013.01); B29C 66/92311 (2013.01)

(58) Field of Classification Search
None
See application file for complete search history.

(56) References Cited

U.S. PATENT DOCUMENTS

| 3,684,395 | A |   | 8/1972 | Nurakami |
|---|---|---|---|---|
| 3,905,862 | A | * | 9/1975 | Takahashi ............... B29C 65/08 156/580.1 |
| 4,224,091 | A | * | 9/1980 | Sager ................... A47G 1/0605 156/204 |
| 4,527,727 | A | * | 7/1985 | Renshaw ............... B23K 20/10 156/580.1 |
| 4,545,519 | A | * | 10/1985 | Renshaw ............... B23K 20/10 156/580.2 |
| 4,584,037 | A | * | 4/1986 | Fortuna ............... B29C 65/0672 156/165 |
| 5,772,103 | A | * | 6/1998 | Hofius, Sr. .......... B29C 65/0672 156/73.5 |
| 5,833,127 | A | * | 11/1998 | Powell ................. B23K 20/121 156/73.5 |
| 6,168,063 | B1 | * | 1/2001 | Sato ...................... B23K 20/10 148/558 |
| 6,170,731 | B1 | * | 1/2001 | Hofius, Sr. .......... B29C 65/0672 228/102 |

(Continued)

FOREIGN PATENT DOCUMENTS

| DE | 1938071 | 2/1970 |
|---|---|---|
| DE | 99938 | 9/1973 |

(Continued)

Primary Examiner — Kiley Stoner
(74) Attorney, Agent, or Firm — Cantor Colburn LLP

(57) ABSTRACT

The present invention relates to a stand for a welding machine having a base plate and a column which is flexurally rigidly connected thereto and which is attached to a guide rail. The rack furthermore has a linear drive for applying a force from a work member to a work piece which can positioned on the base plate, the linear drive being supported by a slide which is displaceably guided along the guide rail. A support is furthermore provided which supports the slide and which counteracts a force-induced displacement of the slide by the linear drive.

12 Claims, 4 Drawing Sheets

(56) References Cited

U.S. PATENT DOCUMENTS

Figure 1:
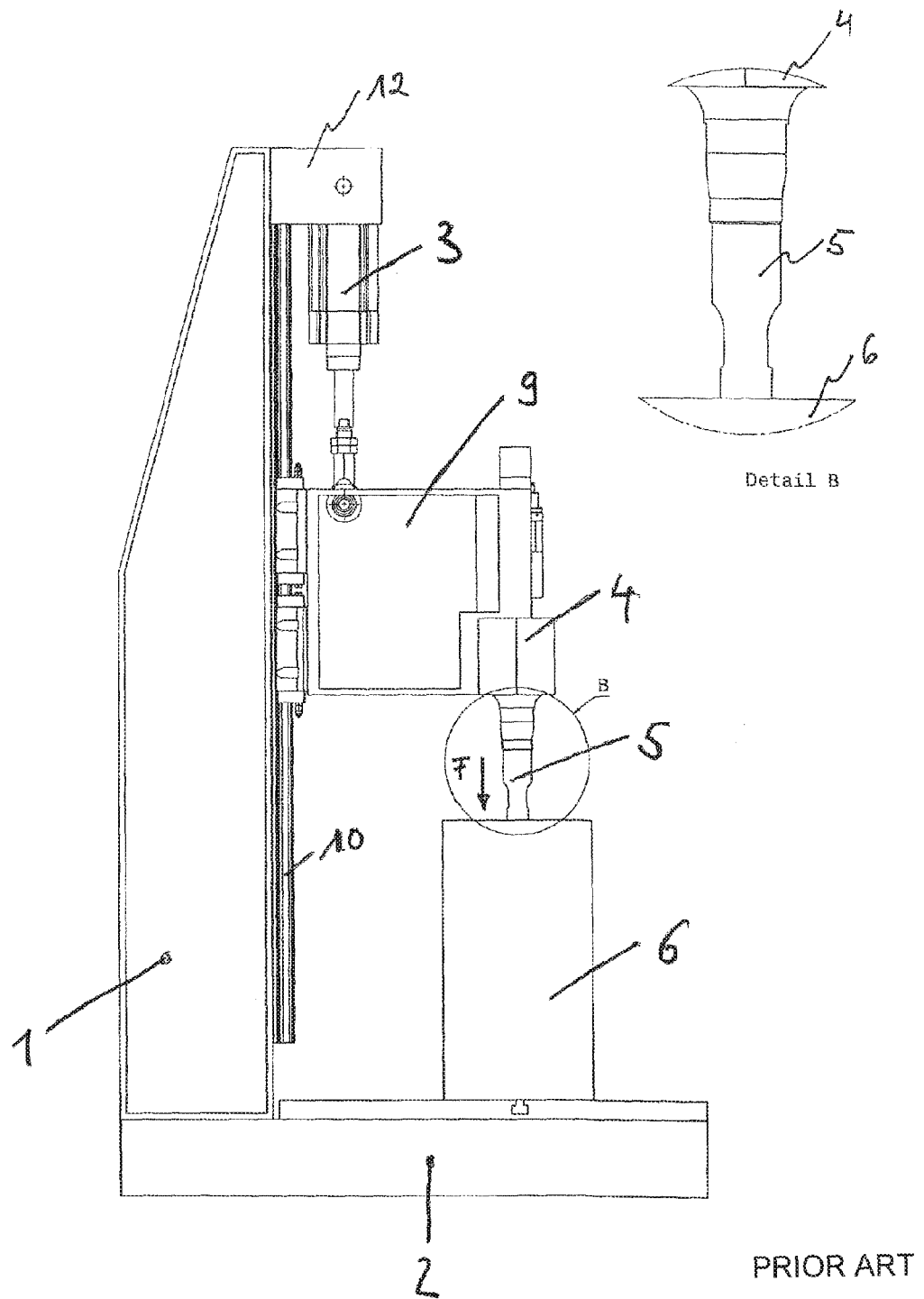

| | | | | |
|---|---|---|---|---|
| 6,296,726 B1* | 10/2001 | Pencak | B29C 65/0672 | 156/580 |
| 6,302,315 B1* | 10/2001 | Thompson | B23K 20/123 | 228/112.1 |
| 6,336,803 B1* | 1/2002 | Funger | B01J 19/10 | 156/580.2 |
| 6,491,785 B1* | 12/2002 | Sato | B23K 20/10 | 156/358 |
| 6,592,711 B1* | 7/2003 | Kubik | B06B 3/00 | 156/379.6 |
| 6,605,178 B1* | 8/2003 | Shinohara | B29C 65/08 | 156/379.6 |
| 6,620,291 B1* | 9/2003 | Gartland | B29C 65/08 | 156/358 |
| 7,819,158 B2* | 10/2010 | Klinstein | B29C 65/08 | 156/358 |
| 2002/0027153 A1* | 3/2002 | Sayama | B23K 20/122 | 228/112.1 |
| 2002/0079039 A1* | 6/2002 | Azulay | A41D 27/245 | 156/73.1 |
| 2002/0189767 A1* | 12/2002 | Yamauchi | H01L 21/67144 | 156/580 |
| 2003/0066862 A1* | 4/2003 | Popoola | B23K 20/106 | 228/110.1 |
| 2003/0079842 A1* | 5/2003 | Behnke | B29C 65/18 | 156/582 |
| 2004/0074944 A1* | 4/2004 | Okamoto | B23K 20/122 | 228/2.1 |
| 2004/0079787 A1* | 4/2004 | Okamoto | B23K 20/125 | 228/112.1 |
| 2005/0001010 A1* | 1/2005 | Koga | B23K 20/123 | 228/2.1 |
| 2009/0159639 A1* | 6/2009 | Fukuhara | B23K 20/1265 | 228/2.1 |
| 2009/0188966 A1* | 7/2009 | Klinstein | B29C 65/08 | 228/102 |
| 2009/0255979 A1* | 10/2009 | Saito | H01L 24/75 | 228/1.1 |
| 2009/0266869 A1* | 10/2009 | Sato | B23K 20/10 | 228/1.1 |
| 2010/0163604 A1* | 7/2010 | Noe | B21C 47/247 | 228/114 |
| 2010/0206487 A1* | 8/2010 | Arai | B23K 20/106 | 156/379.6 |
| 2011/0036897 A1* | 2/2011 | Nakai | H01L 21/67092 | 228/1.1 |
| 2011/0041982 A1* | 2/2011 | Fleming | B23K 20/123 | 156/64 |
| 2011/0073258 A1* | 3/2011 | Christ | B23K 20/121 | 156/378 |
| 2011/0099808 A1* | 5/2011 | Imamura | H01H 11/041 | 29/882 |
| 2012/0048477 A1* | 3/2012 | Johnson | B23K 20/1205 | 156/580 |
| 2012/0118937 A1* | 5/2012 | Enzaka | B23K 20/123 | 228/112.1 |
| 2013/0119115 A1* | 5/2013 | Kato | B23K 20/1255 | 228/112.1 |
| 2014/0144972 A1* | 5/2014 | Takasugi | B23K 20/1245 | 228/112.1 |
| 2014/0262050 A1* | 9/2014 | Hsu | B29C 65/02 | 156/510 |
| 2014/0338841 A1* | 11/2014 | Johnson | B23K 20/1205 | 156/580.1 |
| 2014/0367020 A1* | 12/2014 | Klinstein | B29C 66/9511 | 156/64 |

FOREIGN PATENT DOCUMENTS

| | | |
|---|---|---|
| DE | 8316643 U1 | 10/1983 |
| JP | 60080508 A | 5/1985 |
| WO | 2010022810 A1 | 3/2010 |

\* cited by examiner

Detail B

STAND FOR A MACHINE

CROSS-REFERENCES TO RELATED APPLICATIONS

This application claims priority to German patent application no. 102014101627.0, filed on Feb. 10, 2014, the contents of which is incorporated herein by reference, in its entirety.

The present invention relates to a stand for a machine, for example for a stamping, punching or welding machine, in particular for an ultrasound welding machine, having a base plate serving as a pedestal for the welding machine, having a column which is flexurally rigidly connected to the base plate and along which a guide rail is provided, and having a linear drive with which a force from a sonotrode of the welding machine serving as a work member can be applied to a workpiece which can be positioned on the base plate.

Figure 2:
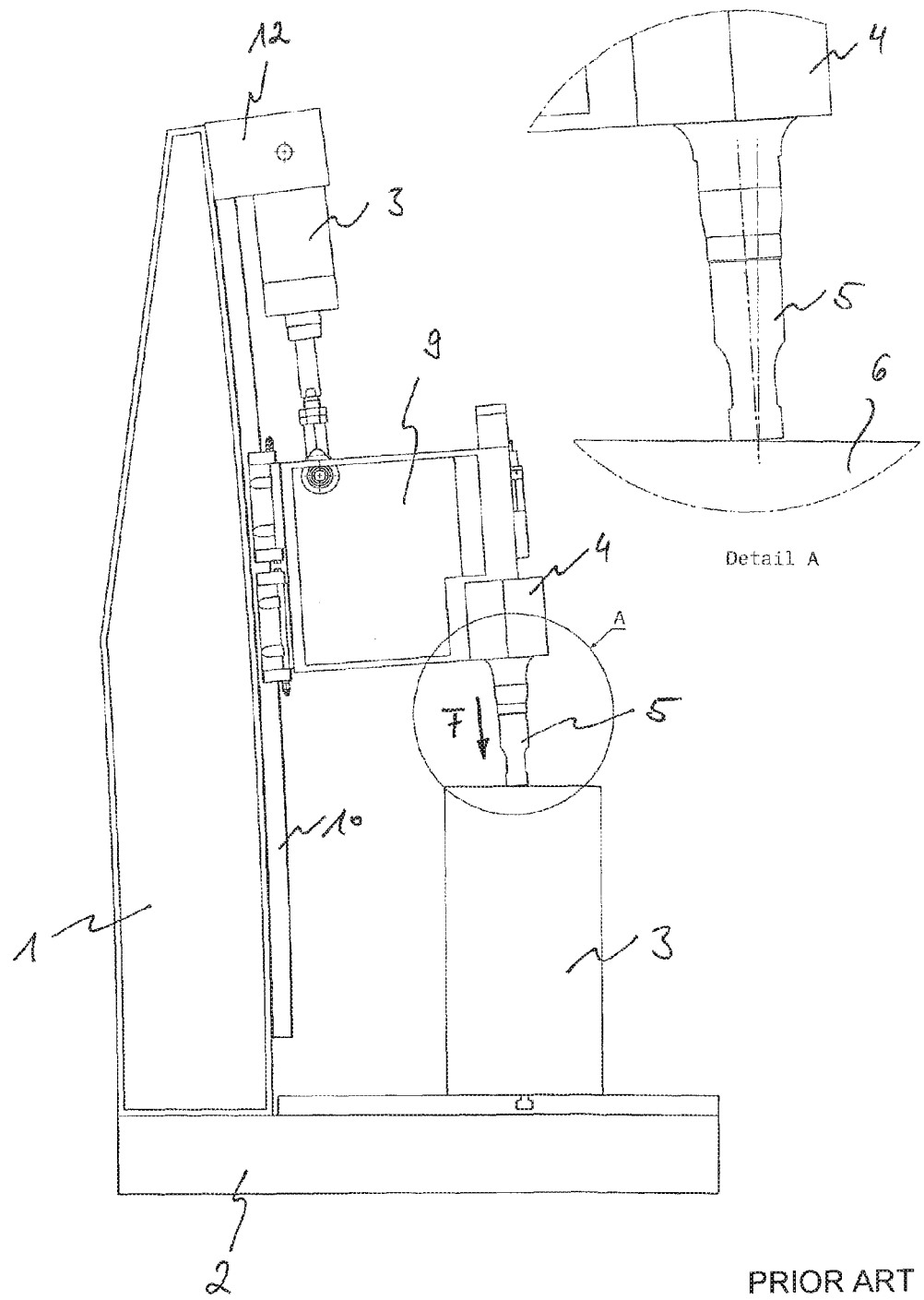

Such a stand known per se is shown in FIGS. 1 and 2. As already mentioned, the stand 20 shown has a base plate 2 on which a workpiece 6 to be welded can be arranged and which is flexurally rigidly connected to a column 1 standing upright. A collar arm 12 is attached in a comparatively flexurally rigid manner to the column 1, at the topmost end thereof, and in turn supports a drive 3 for generating the required welding force F. The welding force F of the drive 3 is transferred via a slide 9, which is guided displaceably in a vertical direction along a guide rail 10 at the column 1, onto a sonotrode 5 which serves as a work member, which is supported by the slide 9 and which is excited to make high-frequency vibrations by a resonant unit 4 at the slide 9.

If now the required welding force F is applied to the workpiece 6 via the sonotrode 5 with the aid of the drive 3, this can have the result that the stand 20, and in particular the column 1, elastically deforms and bends, as is schematically shown in FIG. 2. As can be seen from this Figure, the column 1 was bent to the left as a result of the application of the welding force F to the workpiece 6, which has the unwanted result that the head of the sonotrode 5 no longer stands fully areally on the surface of the workpiece 6, as can in particular be recognized in the enlarged detail "A" of FIG. 2. Such a non-parallelism between the sonotrode 5 and the workpiece 6 can, however, be at the unwanted cost of the work result and in particular of the weld seam quality.

Another stand is furthermore known from document DE 83 16 643 U1. This stand has features of the preamble of claim 1 and in particular has a suspension device which is formed in the manner of a gallows and at which a headstock is suspended via a suspension element. However, only the weight of the headstock can be dissipated via the gallows-like suspension device since the suspension device is only supported on the running surface of a beam-like support element by means of a roll. No lifting forces can thus be dissipated via the gallows-like suspension device, i.e. no forces which can arise as a result of an action of force by a tool.

It is thus the underlying object of the invention to provide a stand for a welding machine in which a bending of the stand is minimized which is due to the lifting forces which are caused as a reaction to forces applied to a tool.

This object is satisfied by a stand having the features of claim 1 and in particular in that the slide supports the linear drive; in that the work member is aligned with the displacement path of the linear drive; and in that the support is configured such that it counteracts a force-induced displacement of the slide as a result of a force application by the linear drive onto a workpiece which can be positioned on the base plate.

In accordance with the invention, the linear drive is therefore not supported by the column of the stand of the welding machine, but rather by an additional support which can be formed, for example, by a support member which is supported by the base plate, which will be looked at in more detail below. This support can admittedly be designed as relatively stiff, for example by a corresponding dimensioning of the named support member, so that said support member deforms relatively little as a result of the welding force generated by the linear drive; nevertheless, possible deformations of the support or of the support member, in particular in the vertical direction, cannot be fully precluded so that provision is made in accordance with the invention for the avoidance of unwanted stresses in the linear drive and in the slide supporting it that this slide is guided displaceably along the guide rail which extends in the vertical direction along the column. The slide together with the linear drive can therefore escape guided in a vertical direction when the support supporting the slide is deflected upwardly slightly in a vertical direction as a result of a welding force generated by the linear drive. The column is, in contrast, not deflected as a result of the welding force, whereby possible non-parallel states between the sonotrode and the workpiece are avoided in the desired manner.

To ensure that the slide which supports the linear drive undergoes a movement component very largely orientated only in the vertical direction as a result of the welding force generated by the linear drive, provision is furthermore made that the work member in the form of the sonotrode is aligned with the adjustment member of the linear drive or is arranged in an extension of the displacement path thereof. Where it is spoken of here that the work member is aligned with the linear drive or with its displacement path or with other positions, this means that there is substantially no offset between the work member and the linear drive or its adjustment path or the other positions. As good as no offset movements are thus generated so that the slide does not cant. The desired orientation between the work member and the workpiece can thus be substantially maintained even under load.

Advantageous embodiments of the invention will now be looked at in the following, with further embodiments also being able to result from the dependent claims, from the description of the Figures and from the drawings.

The support for the slide which supports the linear drive can admittedly be formed in accordance with the preceding statements by a support member which is connected to the base plate; in accordance with a simple embodiment, it would, however, likewise be possible that the support in question is formed, for example, by a collar carrier, a console or the like which is a fixed component of the production line in which the welding stand is located. The base plate together with the column can, for example, stand on a table, whereas the support is formed by a construction member fixed in position at the construction side such as a wall projection or a support console or the like. In this case, the support can displaceably support the slide in a horizontal direction in order thus to be able to compensate possible movement differences between the fixed-position construction member and the slide. For example, the slide can be coupled to the support via a horizontal slot guide which is formed by a spigot guided in a slot.

In order, however, to be independent of external conditions on the setting up of the welding stand, provision is made in accordance with the above statements in accordance with a preferred embodiment that the support is formed by a support member which is preferably pivotally connected to both the slide which supports the linear drive and the base plate. The support member is thus an integral component of the stand in accordance with the invention so that the welding stand can basically be set up to be used at any desired locations.

In accordance with a simple embodiment, the support member can, for example, be formed by a comparatively rigid bar or support which connects the base plate to the slide which supports the linear drive. The slide is thus so-to-say coupled to the base plate by the bar or by the support so that the slide can only deform within the framework of the elastic deformation of the bar or of the support as a consequence of the welding force generated by the linear drive.

Since such a linear bar or support can, however, constrain the working space between the slide and the base plate, provision is made in accordance with a preferred embodiment that the support member is formed by at least one hoop which is preferably substantially of C shape and which is pivotably connected to the slide or to the base plate in the region of its two free ends. In this respect, the at least one substantially C-shaped hoop can preferably have a web section and a first and second flange section, wherein the web section extends in parallel with the column of the stand and the two flange sections project like a collar from the web section. In this case, the first flange section is pivotably connected at its free end to the slide for the linear drive, whereas the second flange section is pivotably connected at its free end to the base plate. In this respect, the second flange section is preferably taken up by the base plate, for which purpose the base plate can form a receiving hollow space into which the second flange section of the respective hoop extends. The work space between the slide and the base plate is thus so-to-say partly surrounded by the at least one substantially C-shaped hoop so that the work space is free from constraints by the hoop.

It can admittedly be sufficient in accordance with an embodiment to connected the slide and the base plate to one another via only a single hoop; since this can, however, result in asymmetrical load states in the stand, provision is made in accordance with a preferred embodiment that the stand has two substantially C-shaped hoops whose web sections flank the column of the stand at both sides. Each of the two hoops thus approximately takes up the same load, whereby possible deformations perpendicular to the hoop plane as a result of asymmetrical load states are counteracted.

To ensure that the slide which supports the linear drive undergoes a movement component very largely orientated only in the vertical direction as a result of the welding force generated by the linear drive, provision is made in accordance with the above explanations that the work member in the form of the sonotrode is aligned with the adjustment member of the linear drive or is arranged in an extension of the displacement path thereof. Provision can additionally be made to ensure only vertical movement components of the slide and to minimize a bending of the stand that the pivotable connection points of the support member to the slide and to the base plate are aligned with the displacement path of the linear drive. In other words, the linear drive and the work member as well as the connection points of the support member to the slide and to the base plate are therefore substantially located on a straight line since it can hereby be achieved that a welding force caused by the linear drive is very largely translated into a purely vertical movement component of the slide.

Provision is made in accordance with a further embodiment that the sonotrode is driven by a resonant unit which is likewise displaceably guided along the guide rail, and indeed, for example, via a second slide which in turn supports the sonotrode. Only a single guide rail is thus required to be able to realize the displaceable support of the two slides along the column of the stand.

Provision is made accordance with yet a further embodiment, that a deformation measuring device such as a strain gage is provided at the support member and is preferably located in the region of an attenuation of the support member or of one of the hoops. The deformation measuring device is in this respect adapted to provide a deformation factor of the support member representative for the force applied by the linear drive to a force regulating device so that it can take account of the deformation factor or of a force factor derived therefrom as a regulation factor within the framework of a force regulation for the linear drive. The support member will thus namely deform the more as the welding force increases so that the deformation of the support member is representative for the applied welding force. To be able to determine the actually applied welding force, no indirect measurement processes are therefore required which, for example, make use of the motor current for determining the welding force when the linear drive is implemented, for example, as a linear motor or as a spindle drive; there is rather a direct relationship between the deformation of the support member and the applied welding force. This relationship can be stored in the force regulating device or in the deformation regulating device as a look-up table or as a mathematical function so that a statement on the current welding force can be made directly from the deformation of the support member so that it can be taken into account within the framework of a closed regulating loop as a control variable on a force regulation of the linear drive.

As can be seen from the above statements, the weight of the two slides, of the linear drive and of the resonant unit, including that of the sonotrode, is dissipated via the support member in the unloaded state. Since different sonotrodes and resonant units can be used in dependence on the purpose of use of the welding machine, this has the result that the resonant unit undergoes a differently pronounced or large pre-deformation in the unloaded state. Since this pre-deformation is also detected by the deformation measuring device, provision is therefore made in accordance with a further embodiment that the force regulating device is furthermore adapted to calibrate the deformation factor provided by the deformation measuring device in dependence on a pre-deformation of the support member. The force regulating device is thus so-to-say adapted to carry out a zeroizing function and thus a zero calibration of the deformation measuring device.

Figure 3:
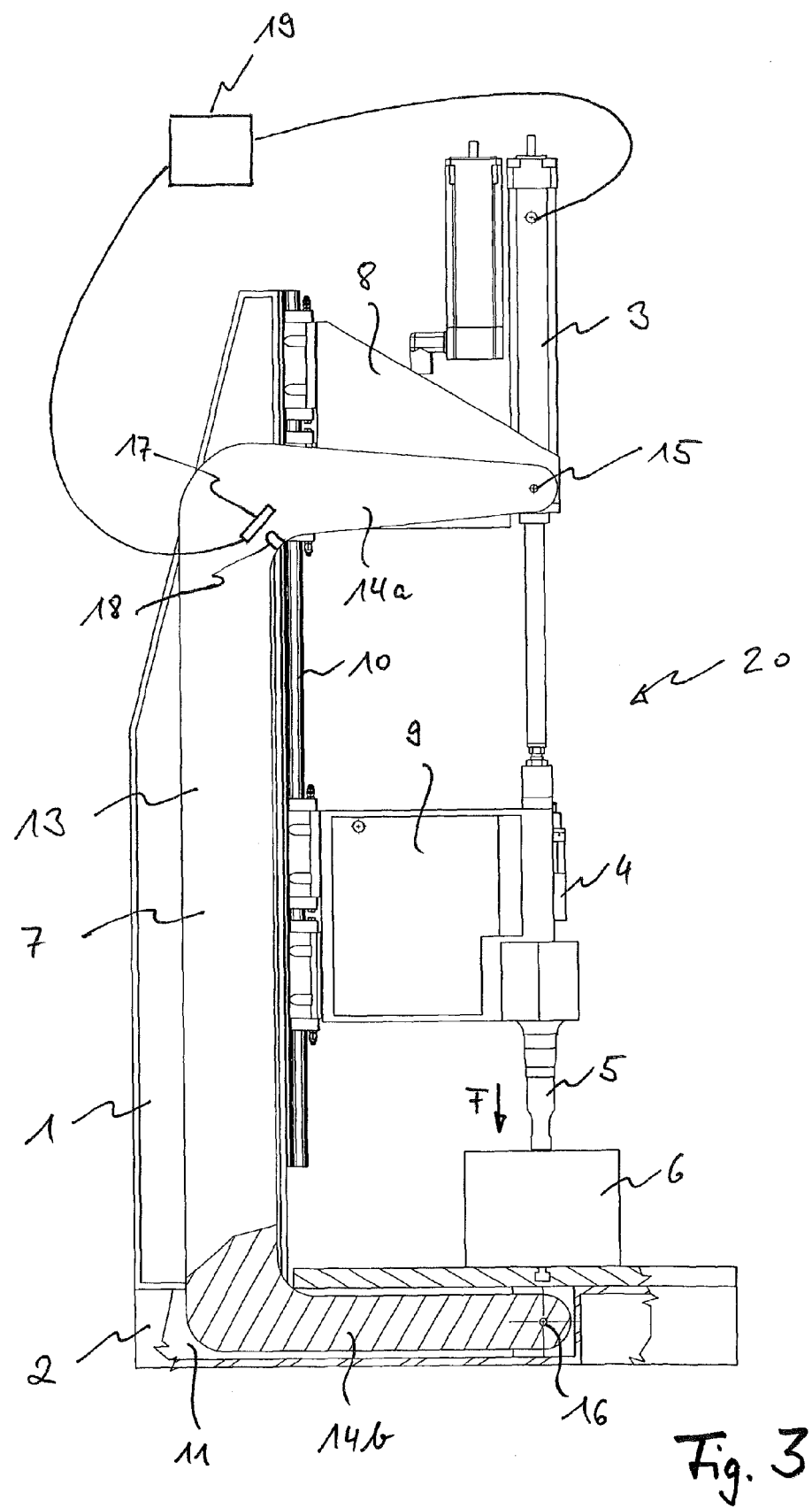
Figure 4:
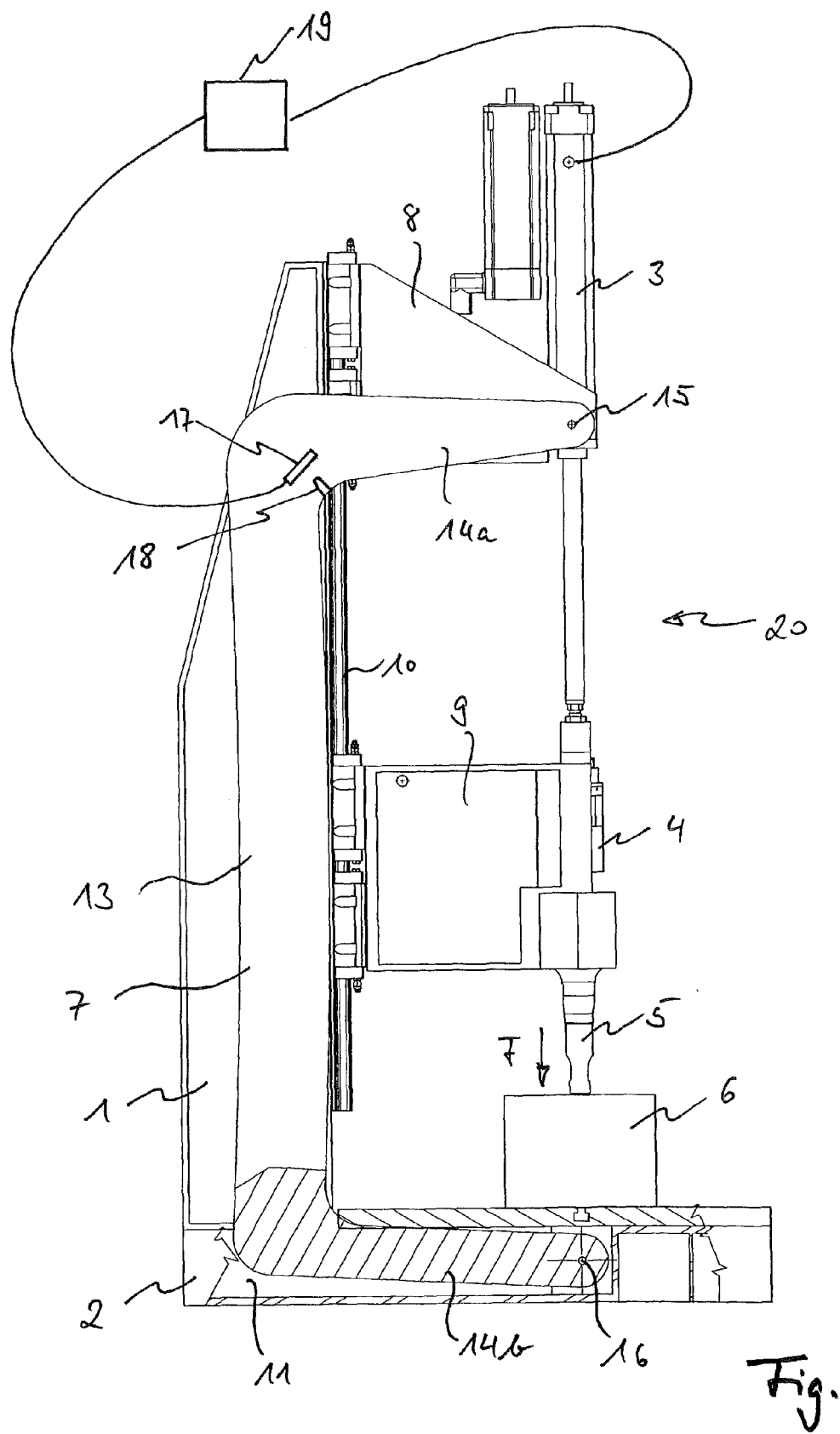

The invention will now be explained purely by way of example with reference to FIGS. 3 and 4. There are shown:

FIG. 1 a stand known in principle for a welding machine in an unloaded state;

FIG. 2 the stand of FIG. 1 in the loaded state;

FIG. 3 a side view of a stand in accordance with the invention in the unloaded state; and FIG. 4 the stand of FIG. 3 in the loaded state.

As can be seen from FIG. 3, the stand 20 in accordance with the invention for a welding machine has a base plate 2 which serves as a pedestal for the welding machine and which is here shown in a partly broken open representation and serves for receiving a workpiece 6. The stand 20 furthermore has a column 1 which stands upright and which is flexurally rigidly connected to the base plate 2. A guide rail 10 which extends in the vertical direction in the longitudinal extent of the column 1 is attached to the column 1. The guide rail 10 in this respect, on the one hand, serves for the displaceable support of a first slide 8 for a linear drive 3 in the region of the upper end of the support 1 as well as of a second slide 9 for a resonant unit 4 for a sonotrode 5 in a working region between the first slide 8 and the base plate 2.

As already indicated, the first slide 8 is displaceably guided along the guide rail 10 and supports a linear drive 3 which can, for example, be a spindle drive, a piston-in-cylinder unit or a linear motor and which serves to apply a welding force F to the workpiece 6 via the sonotrode 5 serving as a work member. Unlike the welding stand known per se in accordance with FIG. 1, the linear drive 3 is thus not rigidly connected to the column 1 via a collar arm; provision is rather made in accordance with the invention that the linear drive 3 is displaceably supported at the column 1 in the vertical direction.

In order to be able to apply the required welding force F onto the workpiece 6 despite this displacement capability with the aid of the linear drive 3, provision is made in accordance with the invention that the first slide 8 is supported by a support which is formed in the embodiment shown here by two C-shaped hoops 7 which flank the column 1 of the stand 20 at both sides. Each of the two substantially C-shaped hoops 7 in this respect has a web section 123 and a first and second flange section 14a, 14b which project like a collar from the web section 13 and are formed in one piece with it. The first flange section 14a of the respective hoop 7 is in this respect pivotably connected at its free end at a connection point 15 to the first slide 8, for example by means of a pin connection. The second flange section 14b is also equally pivotably connected at its free end at a connection point 16 to the base plate 2, for example by means of a pin connection, for which purpose it extends into a receiving hollow space 11 which the base plate 2 forms. The two hoops 7 are thus supported in the vertical direction by the base plate 2 in that they are pivotably attached to the base plate 2. The first slide 8 and the base plate 2 are thus coupled to one another by the two hoops 7, which has the consequence that the two hoops 7 counteract a force-induced displacement of the first slide 8 by the linear drive 3, but which does not mean that the first slide 8 does not undergo any displacement. The free ends of the two hoop flanges 14a, 14b are rather spread apart in parallel with the column 1 in the vertical direction when a welding force F is transferred by the linear drive 3 via the second slide 9 and the resonant unit 4 supported by it onto the work member 5. In other words, the lifting reaction force which is caused as a reaction to the welding force F applied to the workpiece 6 is therefore introduced via the hoops 7 as a tensile force into the base plate 2, which is possible due to the pivotable connection of the two flange sections 14a, 14b to the slide 8 or to the base plate 2. The two pivotable connection points 15, 16 can thus, for example, be pin connections or any other desired types of connection, provided that they can be transferred by these lifting forces onto the hoops 7 and from them onto the base plate 2.

So that in this respect the free end of the upper hoop flange 14a only undergoes a movement component in the vertical direction, provision is made in the preferred embodiment shown that the work member 5 is aligned with the linear drive 3 or with its displacement path and that also the pivotable connection points 15, 16 of the two flanges 14a, 14b the first slide to 8 or to the base plate 2 are aligned with the displacement path of the linear drive 3. Where it is spoken of here that the work member 5 is aligned with the linear drive 5 or with its displacement path, this means that there is substantially no offset between the work member 5 and the linear drive 3 or its displacement path. No force components or only small force components are thus caused by the linear drive 3 perpendicular to its displacement path, which has the consequence in the desired manner that the free end of the upper hoop flange 14a only undergoes a movement component in the vertical direction. So that no unwanted stresses are caused in the linear drive 3 or in the first slide 8 supporting the linear drive 3 by this vertical movement component, the first slide 8 is displaceably supported at the guide rail 10 in the manner in accordance with the invention so that it is displaced by the same amount in the vertical direction as the free end of the upper hoop flange 14a. Apart from this, the hoops 7 are supported at the column 1 by the first slide 8 in the horizontal direction so that the hoops 7 are held in the desired position. The first slide 8 thus forms a single-value or displaceable support for the two hoops 7 in a static sense that prevents the hoops 7 from tilting about the connection point 16 to the base plate which forms a two-value or pivotable support for the hoops 7 in the static sense.

It would admittedly likewise be possible in principle to connect the two connection points 15, 16 directly to one another by means of a bar or a support instead of via C-shaped hoops. However, the working space between the first slide 8 and the base plate 2 would hereby be constrained so that two C-shaped hoops 7 are to be given priority in accordance with the embodiment shown.

To be able to determine the welding force F exerted by the linear drive 3 onto the workpiece 6, a deformation measuring device in the form of a strain gage 17 is provided at at least one of the hoops 7 in the embodiment shown. In the embodiment shown, the strain gage 17 is in this respect arranged in the transition region between the upper hoop flange 14a and the hoop web 13 and thus in a range in which comparatively large relative deformations take place. To make such relative deformations even more perceptible for the deformation measuring device 17, the hoop 7 is directly provided with an attenuation 18 in the named transition region. The deformation factor detected by the deformation measuring device 17 is in this respect representative for the welding force F applied by the linear drive 3, with the relationship between the deformation and the welding force F being able to be stored in a look-up table.

In the embodiment shown, the deformation factor detected by the deformation measuring device 17 is provided to a force regulating device 19 which is adapted to take account of the deformation factor or of a force factor derived therefrom as a regulation factor within the framework of a force regulation for the linear drive 3. The force regulating device 19 therefore compares the deformation factor or a force factor derived therefrom with a desired factor of the welding force F to determine a variable for regulating the linear drive 3 in dependence on the desired factor and on the regulation factor.

Since the weight of the two slides 8, 9 of the linear drive 3 and of the resonant unit 4, including the sonotrode 5, is dissipated via the support member in the unloaded state, it can occur in dependence on the used sonotrode type and on the resonant unit that the resonant structure undergoes differently pronounced or large pre-deformations in the unloaded state. Since these pre-deformations are also detected by the deformation measuring device 17, provision is therefore made in the embodiment shown that the force regulating device 19 is furthermore adapted to calibrate the deformation factor provided by the deformation measuring device 17 in dependence on a pre-deformation of the hoops 7. The force regulating device 19 is thus so-to-say adapted to carry out a zeroizing function and thus a zero calibration of the deformation measuring device.

REFERENCE NUMERAL LIST 1 column
2 base plate
3 linear drive
4 resonant unit
5 work member or sonotrode
6 workpiece 7 hoop
8 first slide
9 second slide
10 guide rail
11 receiving hollow space in 2
12 collar arm
13 web of 7
14a, 14b upper or lower flange of 7
15 upper connection point
16 lower connection point
17 deformation measuring device
18 attenuation
19 force regulating device
20 stand
F welding force

The invention claimed is:

1. A stand for a welding machine, comprising:
a base plate;
a column which is connected to the base plate;
a guide rail which is provided along the column;
a linear drive for applying a force from a work member to a workpiece which can be positioned on the base plate;
a slide which is displaceably guided along the guide rail; and
a support which supports the slide, wherein:
the slide supports the linear drive, the work member is aligned with the displacement path of the linear drive, the support is configured to counteract a force-induced displacement of the slide as a consequence of a force application by the linear drive onto a workpiece which can be positioned on the base plate, the support is formed by a support member which is connected both to the slide and to the base plate, the support member is pivotably connected both to the slide and to the base plate.

2. The stand in accordance with claim 1, in which the welding machine is an ultrasound welding machine.

3. The stand in accordance with claim 1, further comprising a sonotrode as the work member, the sonotrode being driven by a resonant unit, with the resonant unit likewise being displaceably guided along the guide rail.

4. A stand for a welding machine, comprising:
a base plate;
a column which is connected to the base plate;
a guide rail which is provided along the column;
a linear drive for applying a force from a work member to a workpiece which can be positioned on the base plate;
a slide which is displaceably guided along the guide rail; and
a support which supports the slide,
wherein:
the slide supports the linear drive, the work member is aligned with the displacement path of the linear drive, the support is configured to counteract a force-induced displacement of the slide as a consequence of a force application by the linear drive onto a workpiece which can be positioned on the base plate, the support member is formed by at least one hoop having two free ends, said hoop being pivotably connected in the region of the two free ends to the slide or to the base plate, the at least one hoop having a web section and a first and a second flange section, with the web section extending in parallel with the column of the stand and the two flange sections projecting from the web section like a collar, with the first flange section being pivotably connected at a free end of the first flange section to the slide and the second flange section being pivotably connected at a free end of the second flange section to the base plate.

5. The stand in accordance with claim 4, in which the hoop is an at least substantially C-shaped hoop.

6. The stand in accordance with claim 4, in which the second flange section is received by the base plate.

7. The stand in accordance with claim 4, in which the stand has two substantially C-shaped hoops whose web sections flank the column of the stand at both sides.

8. A stand for a welding machine, comprising:
a base plate;
a column which is connected to the base plate;
guide rail which is provided along the column;
a linear drive for applying a force from a work member to a workpiece which can be positioned on the base plate;
a slide which is displaceably guided along the guide rail; and
a support which supports the slide,
wherein:
the slide supports the linear drive, the work member is aligned with the displacement path of the linear drive, the support is configured to counteract a force-induced displacement of the slide as a consequence of a force application by the linear drive onto a workpiece which can be positioned on the base plate, the support member is formed by at least one hoop having two free ends, said hoop being pivotably connected in the ion of the two free ends to the slide or to the base plate, the second flange section is received by the base plate, the base plate having a receiving hollow space into which the second flange section of the respective hoop extends.

9. A stand for a welding machine, comprising:
a base plate;
a column which is connected to the base plate;
guide rail which is provided along the column;
a linear drive for applying a force from a work member to a workpiece which can be positioned on the base plate;
a slide which is displaceable guided along the guide rail; and
a support which supports the slide, wherein the slide supports the linear drive, the work member is aligned with the displacement path of the linear drive, the support is configured to counteract a force-induced displacement of the slide as a consequence of a force application by the linear drive onto a workpiece which can be positioned on the base plate, the support member having pivotable connection points at which the slide and the base plate are aligned with the displacement path of the linear drive.

10. A stand for a welding machine, comprising:
a base plate;
a column which is connected to the base plate;
a guide rail which is provided along the column;
a linear drive for applying a force from a work member to a workpiece which can be positioned on the base plate;
a slide which is displaceably guided along the guide rail;
a support which supports the slide, wherein the slide supports the linear drive, the work member is aligned with the displacement path of the linear drive, the support is configured to counteract a force-induced displacement of the slide as a consequence of a force application by the linear drive onto a workpiece which can be positioned on the base plate; and
a deformation measuring device, the deformation measuring device being provided at the support member, with the deformation measuring device providing a deformation factor of the support member representative for the force applied by the linear drive to a force regulating device which is adapted to take account of the deformation factor or of a force factor derived therefrom as a regulation factor for a force regulation for the linear drive.

11. A stand for a welding machine, comprising:
a base plate;
a column which is connected to the base plate;
a guide rail which is provided along the column;
a linear drive for applying a force from a work member to a workpiece which can be positioned on the base plate;
a slide which is displaceably guided along the guide rail;
a support which supports the slide, wherein the slide supports the linear drive, the work member is aligned with the displacement path of the linear drive, the support is configured to counteract a force-induced displacement of the slide as a consequence of a force application by the linear drive onto a workpiece which can be positioned on the base plate; and
a deformation measuring device, the deformation measuring device being provided at the support member, with the deformation measuring device providing a deformation factor of the support member representative for the force applied by the linear drive to a force regulating device which is adapted to take account of the deformation factor or of a force factor derived therefrom as a regulation factor for a force regulation for the linear drive, the deformation measuring device being located in a region of an attenuation of the support member.

12. A stand for a welding machine, comprising:
a base plate;
a column which is connected to the base plate;
a guide rail which is provided along the column;
a linear drive for applying a force from a work member to a workpiece which can be positioned on the base plate;
a slide which is displaceably guided along the guide rail;
a support which supports the slide, wherein the slide supports the linear drive, the work member is aligned with the displacement path of the linear drive, the support is configured to counteract a force-induced displacement of the slide as a consequence of a force application by the linear drive onto a workpiece which can be positioned on the base plate; and
a deformation measuring device, the deformation measuring device being provided at the support member, with the deformation measuring device providing deformation factor of the support member representative for the force applied by the linear drive to a force regulating device which is adapted to take account of the deformation factor or of a force factor derived therefrom as a regulation factor for a force regulation for the linear drive, the force regulating device being adapted to calibrate the deformation factor provided by the deformation measuring device in dependence on a pre-deformation of the support member.

* * * * *